(12) United States Patent
Tanaka et al.

(10) Patent No.: US 10,514,673 B2
(45) Date of Patent: *Dec. 24, 2019

(54) CONTROL DEVICE FOR MACHINE TOOL PERFORMING OSCILLATION CUTTING

(71) Applicant: FANUC CORPORATION, Yamanashi (JP)

(72) Inventors: Shunpei Tanaka, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/952,267

(22) Filed: Apr. 13, 2018

(65) Prior Publication Data

US 2018/0299856 A1 Oct. 18, 2018

(30) Foreign Application Priority Data

Apr. 18, 2017 (JP) ................... 2017-081994

(51) Int. Cl.
*G05B 19/18* (2006.01)
*G05B 19/404* (2006.01)

(52) U.S. Cl.
CPC ......... *G05B 19/182* (2013.01); *G05B 19/404* (2013.01); *G05B 2219/37372* (2013.01); *G05B 2219/41025* (2013.01); *G05B 2219/45044* (2013.01)

(58) Field of Classification Search
CPC .. G05B 13/0265; G05B 13/028; G05B 19/25; G05B 19/182; G05B 19/404; G05B 2219/31263; G05B 2219/33034; G05B 2219/37372; G05B 2219/45044; G05B 2219/49229; B23Q 15/013; B23Q 15/12;
(Continued)

(56) References Cited

U.S. PATENT DOCUMENTS

| | | | | |
|---|---|---|---|---|
| 3,970,830 A | * | 7/1976 | White | G05B 19/184 700/187 |
| 4,698,773 A | * | 10/1987 | Jeppsson | G05B 19/182 318/571 |
| 10,146,204 B2 | * | 12/2018 | Masumiya | G05B 19/27 |

(Continued)

FOREIGN PATENT DOCUMENTS

JP 2006-172149 A 6/2006
JP 5033929 B1 9/2012
(Continued)

*Primary Examiner* — Crystal J Barnes-Bullock
(74) *Attorney, Agent, or Firm* — Hauptman Ham, LLP

(57) ABSTRACT

A control device of a machine tool includes an oscillation command generation part which generates an oscillation command for at least one feed axis based on a rotation speed of a spindle and a position command of the at least one feed axis so that the oscillation command becomes a positive non-integral multiple of the rotation speed and a tool intermittently cuts a workpiece, an oscillation command correction part which corrects the oscillation command using the position of the feed axis, and an addition part which adds the oscillation command corrected by the oscillation command correction part to a position deviation between the position command and the detected position of the feed axis.

9 Claims, 9 Drawing Sheets

(58) Field of Classification Search
CPC .. B23Q 15/14; B23Q 2705/023; B23B 13/02; B23B 13/08; B23B 25/02
See application file for complete search history.

(56) References Cited

U.S. PATENT DOCUMENTS

| | | | |
|---|---|---|---|
| 10,286,513 B2* | 5/2019 | Yamamoto | G05B 19/182 |
| 2017/0095897 A1* | 4/2017 | Moraru | B23Q 5/402 |
| 2018/0169813 A1* | 6/2018 | Wanner | B23B 41/00 |
| 2018/0299857 A1* | 10/2018 | Oho | G05B 19/25 |
| 2018/0307196 A1* | 10/2018 | Oho | G05B 19/182 |
| 2019/0033816 A1* | 1/2019 | Yamamoto | G05B 19/182 |

FOREIGN PATENT DOCUMENTS

| | | |
|---|---|---|
| JP | 5139592 B1 | 2/2013 |
| JP | 2014-54688 A | 3/2014 |
| JP | 5599523 B1 | 10/2014 |
| WO | 2016/148116 A1 | 9/2016 |

\* cited by examiner

CONTROL DEVICE FOR MACHINE TOOL PERFORMING OSCILLATION CUTTING

RELATED APPLICATIONS

The present application claims priority to Japanese Patent Application No. 2017-081994 filed on Apr. 18, 2017, the disclosure of which is hereby incorporated by reference herein in its entirety.

BACKGROUND OF THE INVENTION

1. Field of the Invention

The present invention relates to a control device for a machine tool which performs oscillation cutting.

2. Description of the Related Art

When swarf is continuously generated during the machining of a workpiece using the cutting tool of a machine tool, the swarf may become entangled with the cutting tool. Thus, a technology of oscillating the tool so as to intermittently cut the workpiece is known (refer to, for example, Japanese Patent No. 5033929 or Japanese Patent No. 5139592).

SUMMARY OF THE INVENTION

However, Japanese Patent No. 5033929 and Japanese Patent No. 5139592 do not take the intermittent cutting at a predetermined machining start position and the vicinity thereof into account. Therefore, when the cutting tool is oscillated at the machining start position and the vicinity thereof, a problem occurs in that the cutting tool moves from the machining start position in the direction opposite to the feed direction of the cutting tool. Thus, depending on the shape of the workpiece, there is a possibility that a cut may occur in the workpiece near the machining start position.

Thus, a control device for a machine tool that can prevent the tool from moving in the direction opposite to the tool feed direction beyond the machining start position is desired.

According to a first aspect of the present disclosure, a control device of a machine tool for cutting an outer peripheral surface or an inner peripheral surface of a workpiece with a tool, the control device comprising a spindle for performing a relative rotation between the workpiece and the tool about an axis of rotation of the workpiece, at least one feed axis for performing a relative feeding between the tool and the workpiece along a generatrix of the outer peripheral surface or the inner peripheral surface of the workpiece, a position detection part for detecting a position of the feed axis, an oscillation command generation part that generates an oscillation command for the at least one feed axis based on a rotation speed of the spindle and a position command for the at least one feed axis so that the oscillation command becomes a positive non-integral multiple of the rotation speed and so that the tool intermittently cuts the workpiece, an oscillation command correction part for correcting the oscillation command generated by the oscillation command generation part using the position of the at least one feed axis detected by the position detection part, and an addition part for adding the oscillation command which has been corrected by the oscillation command correction part to a position deviation, which is a difference between the position command and the detected position of the at least one feed axis detected by the position detection part is provided.

In the first aspect, since the oscillation command is corrected using the actual position of the feed axis, it is possible to prevent the tool from moving in the direction opposite to the tool feed direction beyond the machining start position. Thus, it is possible to prevent cuts in the workpiece.

The objects, features and advantages of the present invention, as well as other objects, features and advantages will be further clarified from the detailed description of the representative embodiments of the present disclosure as shown in the accompanying drawings.

DETAILED DESCRIPTION

Figure 1:
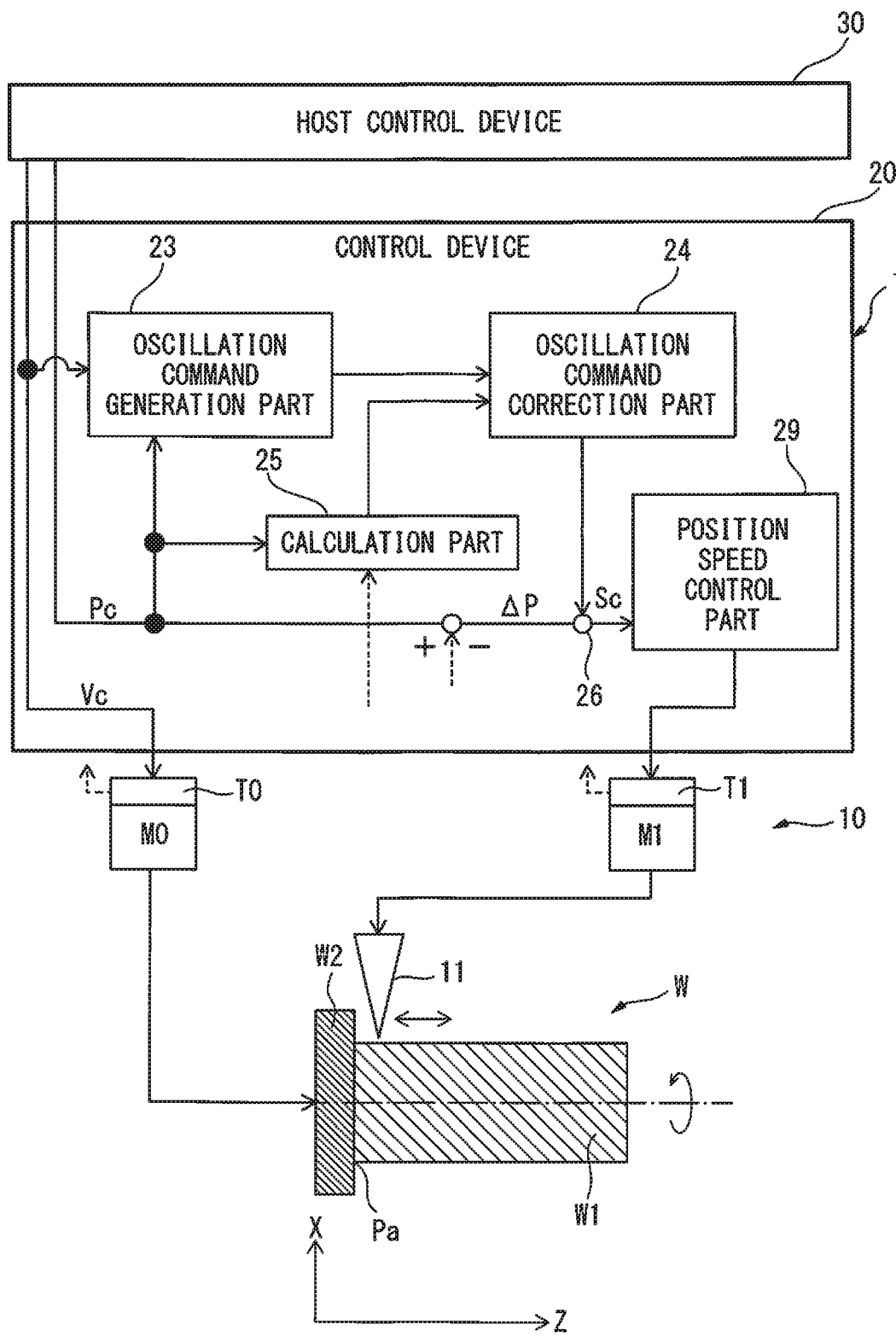
FIG. 1 is a view showing a system including a control device according to a first embodiment.

The embodiments of the present invention will be described below with reference to the accompanying drawings. In the drawings below, the same components are given the same reference numerals. For the ease of understanding, the drawings have been modified in scale. Further, the embodiments shown in the drawings are only examples for carrying out the present invention, and the present invention is not limited to the illustrated embodiments.

FIG. 1 is a drawing of a system including a control device according to a first embodiment. As shown in FIG. 1, the system 1 includes a machine tool 10, a control device 20 for controlling the machine tool 10, and a host control device 30 connected to the control device 20. The machine tool 10 includes a tool 11, and the tool 11 cuts the outer peripheral surface or the inner peripheral surface of a workpiece W, which is at least partially rotationally symmetrical about the axis of rotation O. Furthermore, in FIG. 1, etc., the axis of rotation of the workpiece W is designated as the Z axis, and the axis perpendicular to the Z axis is designated as the X axis.

The spindle M0 of the machine tool 10 rotates the workpiece W around the axis of rotation O thereof. Further, the feed axis M1 of the machine tool 10 moves the tool 11 along the generatrix of the workpiece W. Note that, as will be described later, two or more feed axes M1 and M2 may move the tool 11 along the generatrix of the workpiece W. The feed axes M1 and M2 include feeding mechanisms for the tool 11 and servo motors for driving the feeding mechanisms.

The feed axes M1 and M2 preferably include servo motors. The feed axes M1 and M2 cooperate with the spindle M0 to feed the tool 11 and cut the workpiece W. Note that though the required torque for the spindle M0 and the feed axes M1 and M2 can be estimated, excluding the cutting load, from inertia and the angular acceleration of the command, position detection parts T0, T1 and T2 for detecting the positions and torques of the spindle M0 and the feed axes M1 and M2 may be provided. The position detection parts T0, T1 and T2 may be encoders.

The host control device 30 may be, for example, a PNC (programmable logic controller). The host control device 30 includes the machining conditions of the workpiece W, e.g., the rotation speed command Vc of the spindle M0 which rotates the workpiece W, and position commands Pc of the feed axes M1 and M2 which feed the tool 11. Since the position command Pc is the position command per unit time, the position command Pc may be considered a type of speed command.

The control device 20 is a digital computer including a CPU. The control device 20 includes an oscillation command generation part 23 which generates an oscillation command for at least one feed axis M1 or M2 based on the rotation speed Vc of the spindle M0 and the position command Pc of at least one feed axis M1 or M2 so that the oscillation command becomes a positive non-integral multiple of the rotation speed and the tool 11 intermittently cuts the workpiece W. The oscillation command includes the oscillation frequency and the oscillation amplitude.

Note that, intermittent cutting means that the tool 11 cuts the workpiece W while periodically contacting with and separating from the workpiece W, which is also referred to as oscillation cutting or vibration cutting. Furthermore, in FIG. 1, the workpiece W rotates and the tool 11 oscillates with respect to the workpiece W. However, a configuration in which the tool 11 rotates and the workpiece W oscillates with respect to the tool 11 may be used.

Further, the control device 20 includes an oscillation command correction part 24 for correcting the oscillation command generated by the oscillation command generation part 23 using the positions of the feed axes M1 and M2 detected by the position detection parts T1 and T2 and an addition part 26 for adding the oscillation command which has been corrected by the oscillation command correction part 23 to the position deviation ΔP between the position command Pc and the detected positions Pd of the feed axes M1 and M2 which have been detected by the position detection parts T1 and T2 to generate a resultant command Sc. Further, the control device 20 includes a position speed control part 29 which generates a speed command and a torque command for the feed axes M1 and M2 based on the resultant command Sc and outputs the speed command and torque command to the feed axes M1 and M2, and a calculation part 25 which calculates the distance to the current position of the tool 11 from the machining start position Pa of the workpiece W or the machining change position based on the position of at least one feed axis M1 or M2. The CPU of the control device 20 may fulfill the functions of the oscillation command generation part 23, the oscillation command correction part 24, the calculation part 25, the addition part 26, the position speed control part 29, and a correction ratio calculation part 28, which is described later. The machining change position of the workpiece W means the position at which the machining contents change, e.g., when taper machining is performed after linear machining.

FIGS. 2A through 2D are cross-sectional views of first to fourth workpieces. The workpiece W shown in 2A includes a cylindrical portion W1 and a flange W2 coupled to the cylindrical portion W1. A corner part Q having a substantially perpendicular cross-section is formed between the cylindrical portion W1 and the flange W2. In contrast thereto, in the workpiece W shown in FIG. 2B, the cross-section of the corner part Q between the cylindrical part W1 and the flange W2 is arcuate.

Figure 2A:
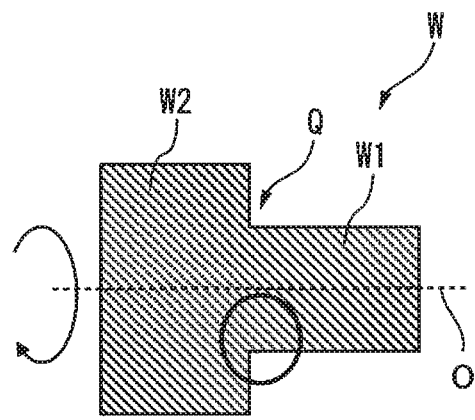
FIG. 2A is a cross-sectional view of a first workpiece.
Figure 2B:
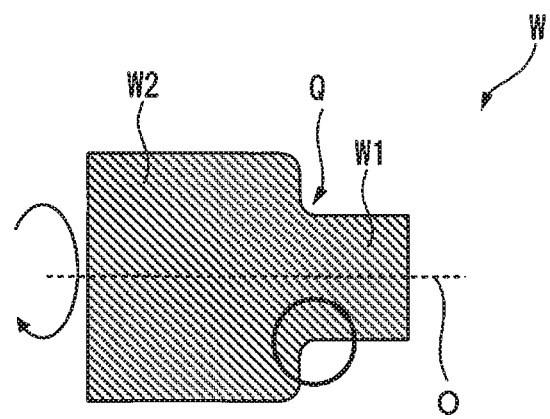
FIG. 2B is a cross-sectional view of a second workpiece.
Figure 2C:
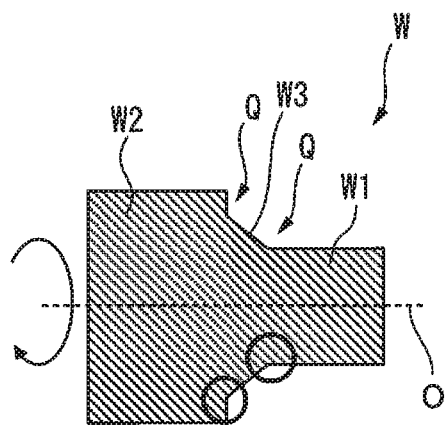
FIG. 2C is a cross-sectional view of a third workpiece.
Figure 2D:
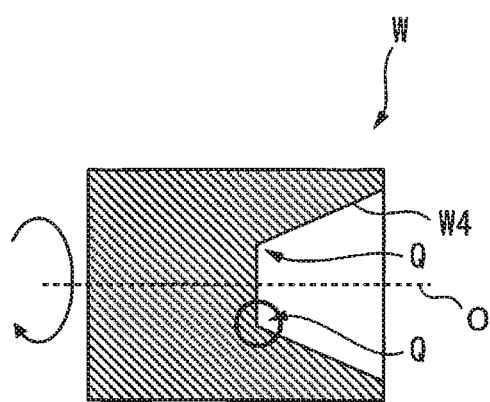
FIG. 2D is a cross-sectional view of a fourth workpiece.

Further, the workpiece W shown in FIG. 2C includes a cylindrical portion W1, a flange W2, and a tapered portion W3 arranged between the cylindrical portion W1 and the flange W2. Corner parts Q having obtuse cross-sections are formed between the cylindrical portion W1 and the tapered portion W3, and between the tapered portion W3 and the flange W2. Furthermore, the workpiece W shown in FIG. 2D is cylindrical, and a truncated cone-shaped recess W4 is formed on an end surface thereof. A corner part Q having an obtuse cross-section is formed between the bottom of the recess W4 and the inner peripheral surface.

The cylindrical portion W1, tapered portion W3 and truncated cone-shaped recess W4 of the workpieces W shown in FIGS. 2A to 2D are rotationally symmetrical about the axis of rotation O. Namely, the workpieces W shown in FIGS. 2A to 2D include a portion which is rotationally symmetrical about the axis of rotation O. The corner parts Q of the workpieces W are radially inward of the radially outermost part of the workpiece W in the cross-section along the axis of rotation O, and these corner parts Q are not continuous with the radially outermost part. In other words, the workpiece W includes a stepped part in the cross-section along the axis of rotation O.

The tool 11 shown in FIG. 1 cuts the outer peripheral surface of the cylindrical portion W1 or tapered portion W3 shown in FIGS. 2A to 2C or the inner peripheral surface of the truncated cone-shaped recess W4 shown in FIG. 2D. Note that it is not necessary that the flange W2 be rotationally symmetrical, but a projection which simply extends in the radial direction may be provided in place of the flange W2. Furthermore, a tapered portion may be provided in place of the cylindrical portion W1.

Figure 3:
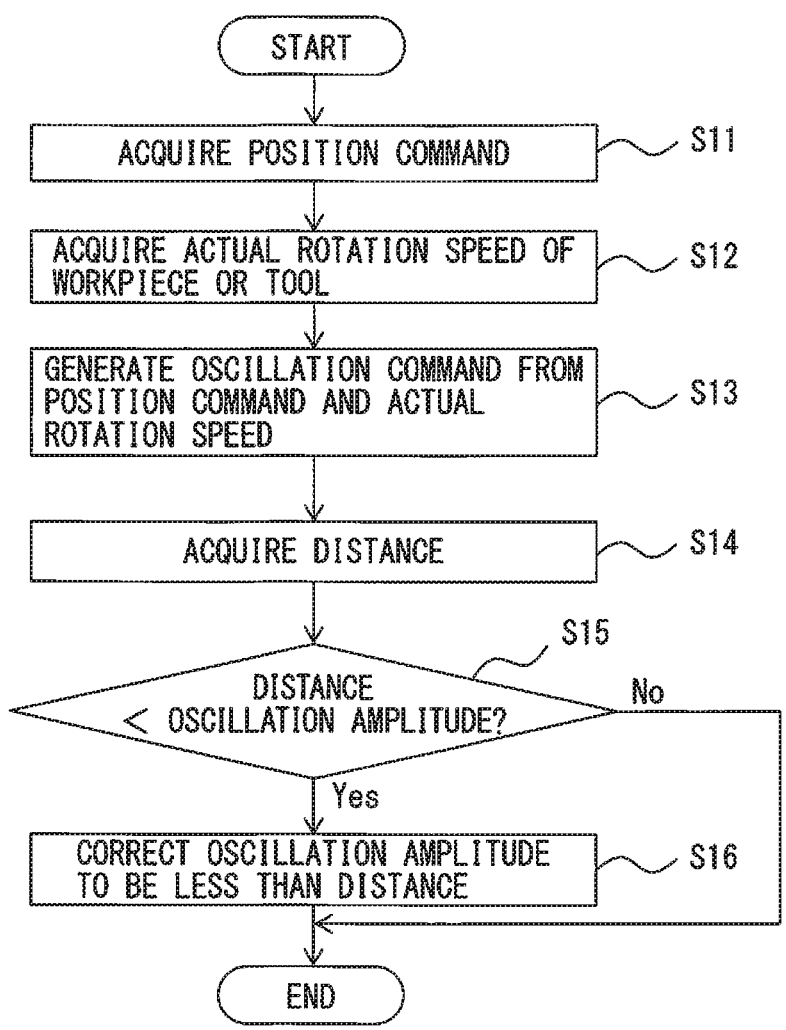
FIG. 3 is a flowchart showing the operations of a control device according to a representative embodiment.

FIG. 3 is a flow chart showing the operations of the control device according to a representative embodiment. For the ease of understanding, a case where the tool 11 cuts the outer peripheral surface of only the cylindrical portion W1 of the workpiece W will be explained. The operations shown in FIG. 3 are repeatedly performed at a predetermined control cycle.

Furthermore, as can be understood from FIG. 1, the flange W2 of the workpiece W is arranged on the minus side of the Z axis. The machining start position Pa is the portion between the flange W2 and the cylindrical portion W1. Strictly speaking, the machining start position Pa corresponds to the coordinate of the end face of the flange W2 on the cylindrical portion W1 side on the Z axis.

First, in step S11, the oscillation command generation part 23 obtains the position command Pc from the host control device 30. Then, in step S12, the actual rotation speed Vd of the spindle is acquired from the plurality of positions of the spindle M0 detected by the position detection part T0 at the predetermined intervals.

Thereafter, in step S13, the oscillation command generation part 23 generates an oscillation command for the feed axis M1 based on the position command Pc and the actual rotation speed command Vd of the spindle. The oscillation command may be generated using the rotation speed command Vc instead of the actual rotation speed command Vd. In the example shown in FIG. 1, since the tool 11 oscillates only along a linear line parallel to the axis of rotation O, an oscillation command for only the feed axis M1 is generated.

Figure 4:
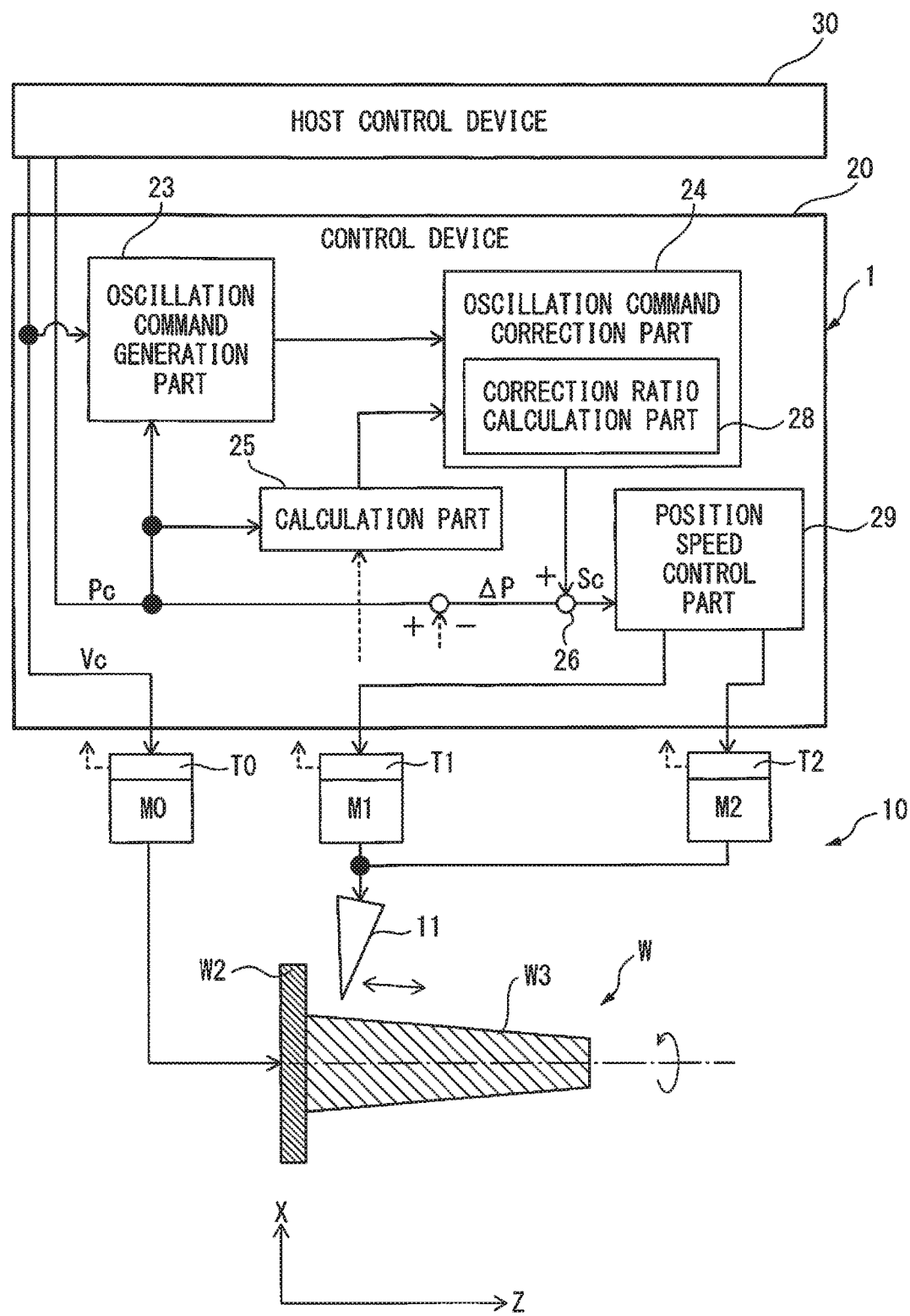
FIG. 4 is a view showing a system including a control device according to a second embodiment.

FIG. 4 shows another system including a control device according to a second embodiment. In the example shown in FIG. 4, the tapered portion W3 is coupled to the flange W2. In such a case, the tool 11 oscillates obliquely along the generatrix of the tapered portion W3 to cut the outer peripheral surface of the tapered portion W3. Since the tool 11 moves in a resultant direction of the X direction and the Z direction, in order to move the tool 11, two feed axes M1 and M2 are required. In such a case, in step S11, oscillation commands for the two feed axes M1 and M2 are generated. Note that a configuration in which the tool 11 is fed by more than two feed axes is included in the scope of the present invention. Furthermore, in such a case, it is assumed that the configuration shown in FIG. 4 is provided for each of the feed axes.

A case in which the tool 11 shown in FIG. 1 cuts the outer peripheral surface of only the cylindrical portion W1 of the workpiece W will be explained below. However, it can be understood that the explanation below substantially applies to the cases shown in FIGS. 2A to 2D and 4.

Figure 5:
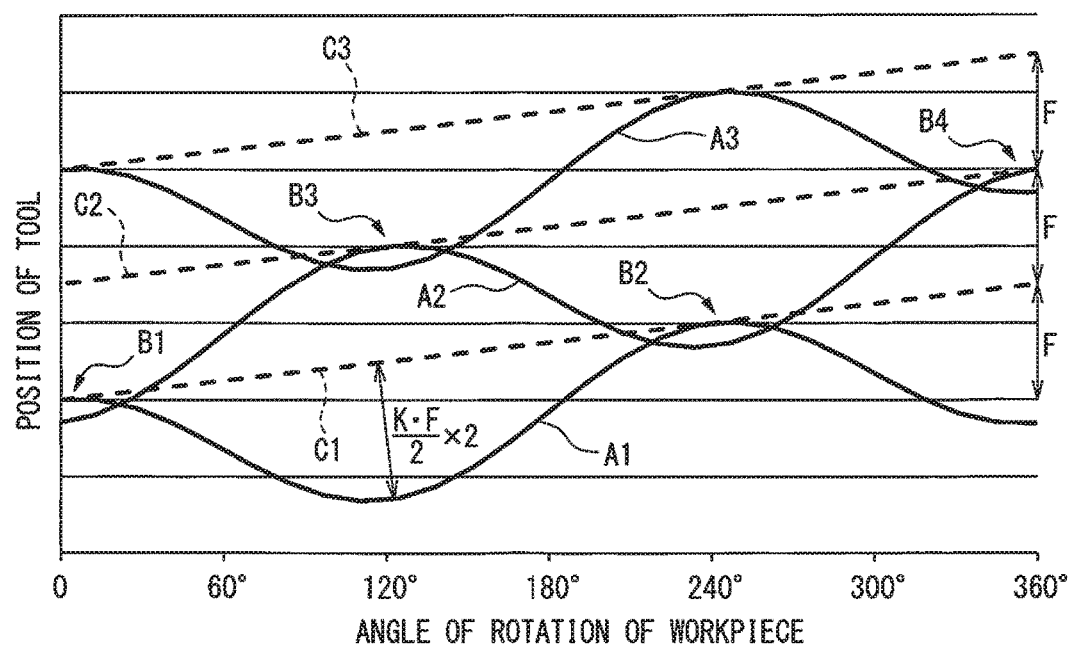
FIG. 5 is a view showing the relationship between feed amount and rotation angle.

FIG. 5 shows the relationship between feed amount and rotation angle. In FIG. 5, the horizontal axis represents the angle of rotation of the workpiece W, and the vertical axis represents the feed amount of the tool 11 in the center axis direction of the workpiece W (i.e., the Z axis direction). FIG. 5 shows a plurality of linear dashed lines C1, C2, C3 . . . which extend in the oblique direction. As can be understood from FIG. 5, the vertical axis coordinate of the point of intersection between the dashed line C1 and the vertical axis corresponds to the vertical axis coordinate of the start point of the next dashed line C2. Similarly, the vertical axis coordinate of the point of intersection between the dashed line C2 and the vertical axis corresponds to the vertical axis coordinate of the start point of the next dashed line C3. The plurality of linear dashed lines C1, C2, C3 . . . indicate the trajectory of the tool 11 on the workpiece W in the absence of an oscillation command. The curves A1, A2, A3 . . . shown in FIG. 5 indicate the trajectory of the tool 11 on the workpiece W in the presence of the oscillation command. In other words, the dashed lines C1, C2, C3, etc., indicate only the position commands before the oscillation commands are added thereto (the original command values), and the curves A1, A2, A3, etc., show the position commands after the oscillation commands have been added thereto (resultant commands). Therefore, the curves A1, A2 and A3 indicate commands obtained by adding the cosine wave-like oscillation commands to the respective position commands represented by the dashed lines C1, C2 and C3.

Furthermore, curve A1 is the trajectory of the tool 11 in the first rotation of workpiece W, curve A2 is the trajectory of tool 11 in the second rotation of workpiece W, and curve A3 is the trajectory of tool 11 in the third rotation of workpiece W. For the sake of simplicity, the trajectories of the tool 11 after the fourth rotation of the workpiece W are not shown.

In step S13 of FIG. 3, the oscillation command generation part 23 within the control part 20 (refer to FIG. 6) generates an oscillation command as follows. In the host control device 30, the position command (dashed lines C1, C2 and C3) of the feed axis M1 is determined. The oscillation command generation part 23 determines the oscillation frequency of the cosine wave-like oscillation command in order to generate commands like the curves A1, A2, and A3 with the dashed lines C1, C2 and C3 as references axes. The value obtained from the expression S/60×I of Formula (1), which is described later, is the oscillation frequency.

When determining the above-described oscillation frequency, as shown in FIG. 5, it is preferable that the initial phase of the cosine wave-like curve A2 using a certain dashed line, for example, dashed line C2, as a reference axis deviate by a half cycle from the cosine wave-like curve A1 using the preceding dashed line, for example, dashed line C1, as the reference axis. The reason for this is that when the period deviates by a half-cycle, the oscillation amplitude of the oscillation command can be minimized, and as a result, swarf can be most efficiently shredded.

Then, the oscillation command generation part 23 determines the oscillation amplitude of the above-mentioned oscillation command in order to generate commands such as the curves A1, A2 and A3 using the dashed lines C1, C2 and C3 as reference axes. The value obtained from the expression K×F/2 in Formula (1), which will be described later, is the oscillation amplitude. Curve A1 and curve A2 shown in FIG. 5 overlap each other at portion B1, where the rotation angle is about 0 degrees, and portion B2, where the rotation angle is about 240 degrees. As can be seen from FIG. 5, the maximum values of curve A1 with respect to dashed line C1 are larger than the minimum values of curve A2 with respect to dashed line C2 at portions B1 and B2. In other words, the oscillation command generation part 23 preferably determines the oscillation amplitude so that the previous curve A1 and the succeeding curve A2 partially overlap each other. In curves A1, A2 and A3, since the feed speed is constant, the oscillation amplitude of each oscillation command is also the same.

At the overlapping portions B1 and B2, since the tool 11 separates from the workpiece W when the tool 11 is machining with the trajectory of curve A2, the workpiece W is not machined. In the present embodiment, since such overlapping portions are periodically generated, so-called intermittent cutting can be performed. In the example shown in FIG. 5, swarf is generated at each of portions B1 and B2 by the operation according to curve A2. Namely, in the second rotation curve A2, swarf is generated twice. Since such intermittent cutting is performed periodically, vibration cutting becomes possible.

Further, curve A3 formed with respect to dashed line C3 has the same shape as curve A1. Curve A2 and curve A3 overlap at portion B3 having a rotation angle of about 120 degrees and at portion B4 having a rotation angle of about 360 degrees. Swarf is generated at each of portions B3 and B4 by the operation according to curve A3. Namely, swarf is generated twice in the third rotation curve A3. Thereafter, swarf is generated twice for each rotation of the workpiece. However, no swarf is generated in the first rotation.

By setting the oscillation frequency and the oscillation amplitude in this manner, the oscillation command generation part 23 generates the oscillation command (step S13). For example, the oscillation command is represented by the following formula.

$$\text{Oscillation command} = (K \times F/2) \times \cos(2\pi \times S/60 \times I \times t) - (K \times F/2) \quad \text{Formula (1)}$$

In Formula (1), K is the oscillation amplitude magnification, F is the movement amount of the tool 11 per rotation of the workpiece W, i.e., the feed amount per rotation [mm/rev] and corresponds to the position command Pd, S is the actual rotation speed Vd [min$^{-1}$], or [rpm] around the center axis of workpiece W, and I is the oscillation frequency magnification. The aforementioned oscillation frequency corresponds to the expression S/60×I in Formula (1), and the aforementioned oscillation amplitude corresponds to the expression K×F/2 in Formula (1). The oscillation amplitude magnification K is an integer of 1 or more, and the oscillation frequency magnification I is a non-integer larger than zero (for example, a positive non-integer such as 0.5, 0.8, 1.2, 1.5, 1.9, 2.3, or 2.5, . . . , etc.). The oscillation amplitude magnification K and the oscillation frequency magnification I are constant (in the example of FIG. 5, I is 1.5).

The reason why the oscillation frequency magnification I is not an integer is that in the case of an oscillation frequency which is exactly the same as the number of rotations of workpiece W around the center axis, it is impossible to generate the overlapping portions B1, B2, B3, B4 and the like described above, and an effect of shredding swarf through oscillation cutting cannot be obtained.

Furthermore, according to Formula (1), the oscillation command is a command in which the expression (K×F/2) is subtracted as an offset value from the cosine waves using dashed lines C1, C2 and C3 as reference axes indicating the position command. Thus, the positional trajectory of the tool 11 based on the command value obtained by adding the oscillation command to the position command can be controlled with the position by the position command as the upper limit in the machining feed direction of the tool 11. Therefore, curves A1, A2, A3, etc., in FIG. 5 are such that the dashed lines C1, C2, C3, etc., are not exceeded in the positive Z axis direction (i.e., the machining feed direction of the tool 11).

Further, using an oscillation command as represented by Formula (1), large oscillation commands are not issued from the start in the feed direction of the tool 11 at the machining start point (0 degrees on the horizontal axis) of the tool 11, as can be seen from curve A1 in FIG. 5. Note that, the initial value of each parameter (K and I in Formula (1)) adjusted when defining the oscillation frequency and the oscillation amplitude is stored in the host control device 30. The rotation speed V of the workpiece W is stored in advance as a machining condition in the host control device 30. The feed amount per rotation F is obtained from the rotation speed V and the position command.

Referring again to FIG. 3, in step S14, the calculation part 25 obtains the position of the feed axis M1 detected by the position detection part T1. The calculation part 25 uses the position of the feed axis 1 to calculate the actual coordinate position of the tool 11 from the machining start position Pa. In other words, the actual coordinate position of the tool 11 is the distance from the machining start position Pa to the current position of the tool 11.

In step S15, it is determined whether or not the oscillation amplitude is greater than the distance calculated by the calculation part 25. When the oscillation amplitude is not greater than the calculated distance, the oscillation command having such an oscillation amplitude continues to be used. Conversely, if the oscillation amplitude is larger than the distance, when the tool 11 is oscillated, the tool 11 moves in the direction opposite to the feeding direction, moving into the minus side beyond the machining start position Pa. Thus, when the oscillation amplitude is greater than the distance, the process proceeds to step S16, and the oscillation command correction part 24 corrects the oscillation command based on the detected position of the feed axis M1.

The oscillation command correction part 24 corrects the oscillation command so that the tool 11 does not move in the opposite direction to the minus side of the machining start position Pa. For example, the oscillation command correction part 24 corrects the oscillation command so that the oscillation amplitude of the oscillation command is less than the distance. As shown in the aforementioned Formula (1), the oscillation amplitude is represented by the expression K×F/2. Thus, in step S16, the oscillation command correction part 24 corrects the oscillation command by selecting an oscillation amplitude magnification K' that satisfies the expression K'≤Z/(K×F/2).

The corrected oscillation command is added to the position deviation ΔP by the addition part 26 of FIG. 1 to generate the resultant command Sc. Thereafter, the position speed control part 29 generates the speed command and torque command based on the resultant command Sc, and supplies the speed command and torque command to the feed axis M1. The feed axis M1 is controlled based on such commands.

Figure 6A:
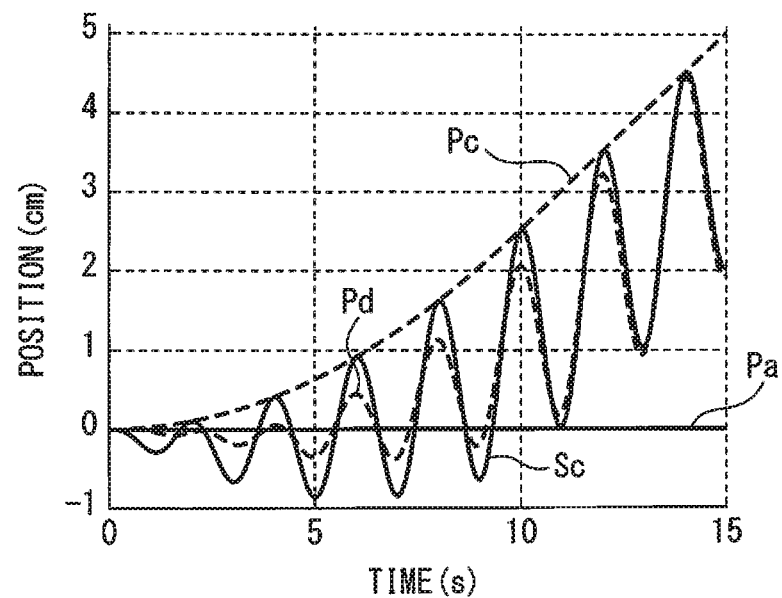
FIG. 6A is a view showing the relationship between time and the position of the tool in the prior art.
Figure 6B:
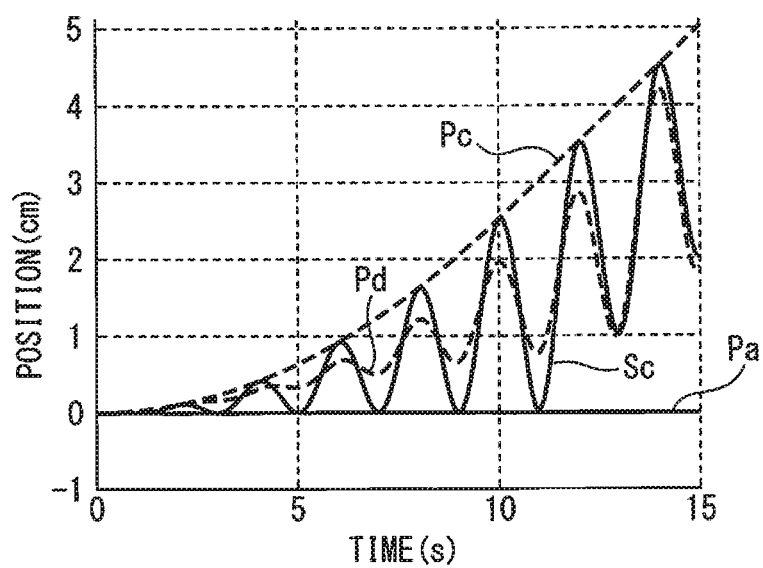
FIG. 6B is a view showing the relationship between time and the position of the tool in the first embodiment.

FIG. 6A and FIG. 6B show the relationship between time and the position of the tool in the prior art and the first embodiment, respectively. In these drawings, the horizontal axis represents time (s) and the vertical axis represents the position (mm) of the tool or the feed axis M1. The vertical axis corresponds to the Z direction shown in FIGS. 1 and 4.

Furthermore, the dashed line represents the position command Pc, and the sinusoidal solid curve represents the resultant command Sc. However, the solid curve which represents the resultant command Sc shown in FIG. 6A has not undergone correction processing by the oscillation command correction part 24. Further, the sinusoidal dashed curve represents the detected position Pd. Note that, the prior art primarily differs from the above-described embodiment in that the oscillation command correction part 24 is not used in the prior art. In these drawings, the straight line indicating the machining start position PA is shown at the 0 mm portion position.

In the conventional technology shown in FIG. 6A, the curve representing the detected position Pd is locally smaller than the machining start position Pa. In such a case, since the tool 11 moves in the direction opposite to the feed direction of the tool and locally exceeds the machining start position Pa, a cut is formed in the flange W2 coupled to the cylindrical portion W1.

In the first embodiment shown in FIG. 6B, correction processing is performed by the oscillation command correction part 24. Thus, since the oscillation command is corrected so that the oscillation amplitude does not exceed the distance calculated by the calculation part 25, the curve representing the detected position Pd will not become smaller than the machining start position Pa. Therefore, it is possible to prevent the tool 11 from moving in the direction opposite to the feed direction of the tool 11 beyond the machining start position Pa. As a result, the occurrence of the formation of a cut in the flange W2 of the workpiece W can be prevented.

As described above, in the example shown in FIG. 4, two feed axes M1 and M2 are required to oscillate the tool 11 obliquely along the generatrix of the tapered portion W3. The oscillation command correction part 24 shown in FIG. 4 includes a correction ratio calculation part 28 that calculates a correction ratio between the oscillation amplitude prior to being corrected by the oscillation command correction part 24 and the oscillation amplitude after correction.

Figure 7:
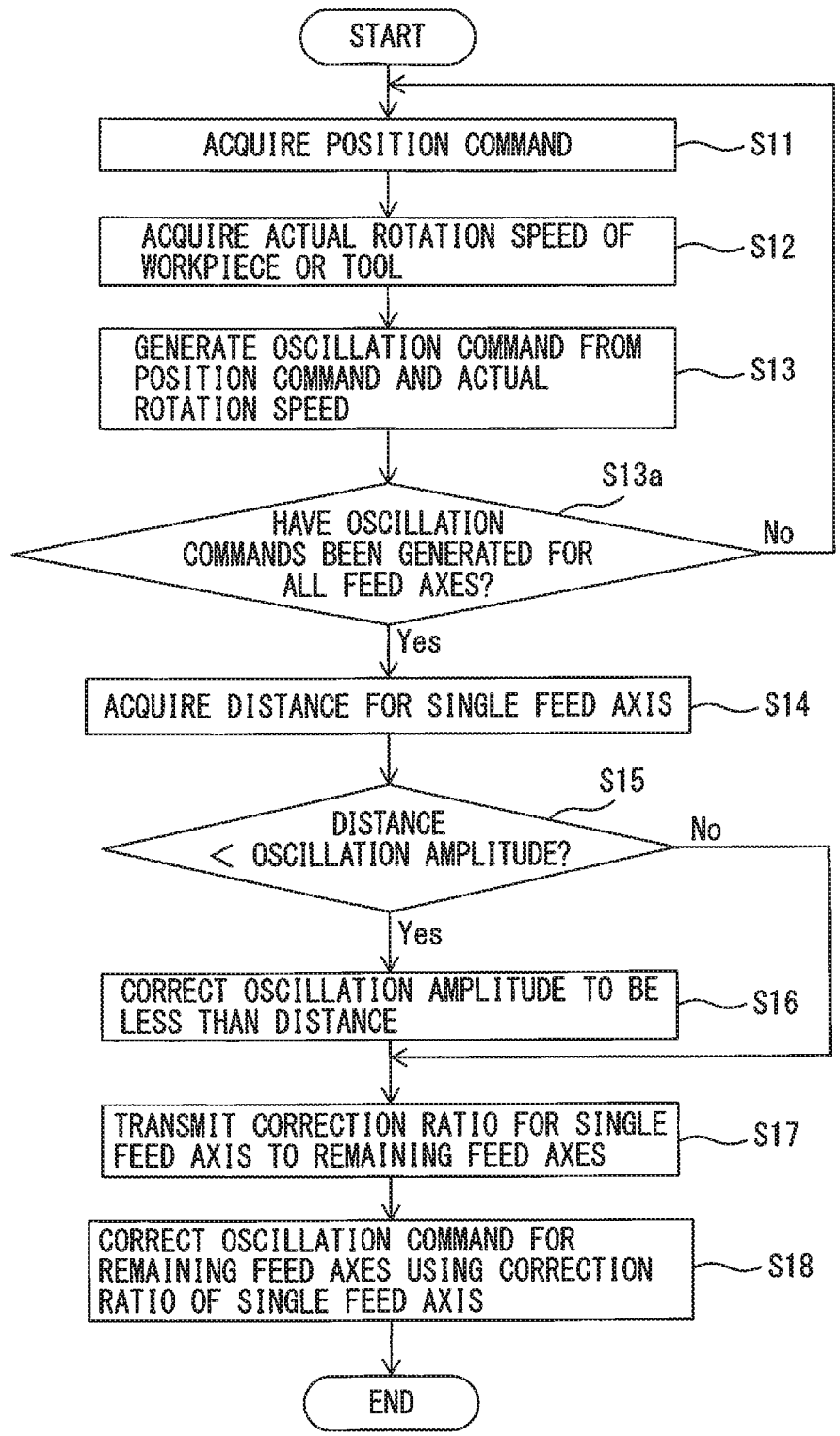
FIG. 7 is a flowchart showing the operations of a control device according to another embodiment.

FIG. 7 is a flowchart showing the operations of a control device according to the embodiment shown in FIG. 4. Steps S11 to S16 of FIG. 7 are substantially the same as those described above, and accordingly, a description thereof is omitted.

Note that, in this case, the processes of steps S11 to S13 are performed for a single feed axis M1. In step S13a, it is determined whether or not an oscillation command has been generated for all of the feed axes. In other words, the processes of steps S11 to S13a are repeated until oscillation commands have been generated for all of the feed axes.

In step S17, the correction ratio calculation part 28 calculates the ratio of the oscillation amplitude after correction to the oscillation amplitude prior to correction for the single feed axis M1, i.e., the correction ratio R1 for the single feed axis M1. The correction ratio R1 for the feed axis M1 is transmitted to the other feed axis M2. Specifically, since the configuration shown in FIG. 4 is provided for each of the feed axes M1 and M2, the correction ratio R1 for the feed axis M1 is transmitted to the oscillation command correction part 24 of the other feed axis M2.

Note that, when a plurality of feed axes other than the feed axis M1 are present, the correction ratio R1 for the feed axis M1 is transmitted to the oscillation command correction part 24 of each of the plurality of feed axes, and a process which is described later is performed.

In step S18, the oscillation command correction part 24 of the feed axis M2 performs correction by multiplying the oscillation amplitude for the feed axis M2 by the correction ratio R1. The addition part 26 of the feed axis M2 generates the resultant command Sc by adding the corrected oscillation command to the position deviation ΔP. Thereafter, the position speed control part 29 of the feed axis M2 generates the speed command and the torque command based on the resultant command Sc, and transmits the speed command and the torque command to the feed axis M2. The feed axis M2 is controlled based on such commands. Note that the oscillation command correction part 24 of the feed axis M1 also performs correction by multiplying the oscillation amplitude of the feed axis M1 by the correction ratio R1, and as a result, the feed axis M1 is controlled as described above.

In this case, since the correction ratio R1 for the feed axis M1 is applied to the remaining feed axis M2, it is possible to prevent the tool 11 from moving in the opposite direction along the axis of the remaining feed axis M2. As a result, the formation of cuts on the flange W2 of the workpiece W can be prevented. Furthermore, since it is not necessary for the oscillation command correction part 24 for the feed axis M2, etc., to independently calculate the correction ratio, the load on the oscillation command calculation part 24 for the feed axis M2, etc., can be reduced.

Figure 8:
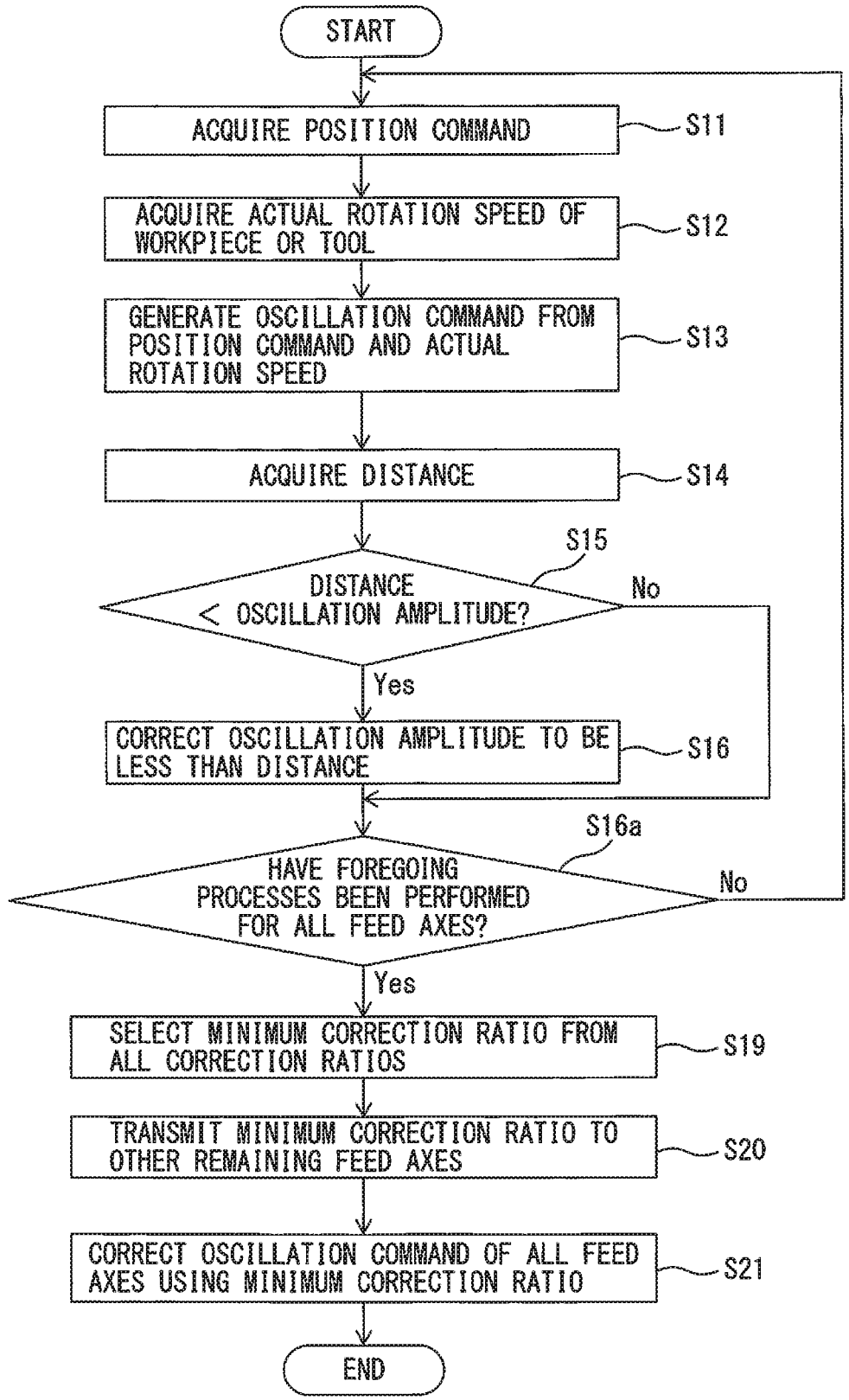
FIG. 8 is a flowchart showing the operations of a control device according to yet another embodiment.

Further, FIG. 8 is another flowchart showing the operations of a control device according to the embodiment shown in FIG. 4. Since steps S11 to S16 of FIG. 8 are substantially the same as those described above, a description thereof is omitted. After step S16, in step S16a, it is determined whether or not the processes for all of the feed axes have finished.

In other words, the processes of steps S11 to S16 are repeated until the distance described above for all of the feed axes M1 and M2 has been compared with the oscillation amplitude. As a result, correction ratios R1 and R2 are determined for all of the feed axes M1 and M2. Note that, when the correction ratios R1 and R2 are not calculated, the process is continued under the assumption that the correction ratios R1 and R2 are "1".

In step S19, the minimum correction ratio Rmin is selected from the correction ratios R1 and R2 for all of the feed axes M1 and M2. Note that, when a plurality of feed axes other than the feed axis M1 are present, correction ratios are calculated for the respective feed axes, and the minimum correction ratio Rmin is selected from among the plurality of correction ratios. Then, in step S20, the minimum correction ratio Rmin is transmitted to the oscillation command correction parts 24 of the other feed axes M1 and M2. Note that, it is not necessary to transmit the minimum correction 5 ratio Rmin to the oscillation command correction part 24 of the feed axis having the minimum correction ratio Rmin.

Thereafter, in step S21, the oscillation command correction parts 24 of the feed axes M1 and M2 perform correction by multiplying the oscillation amplitudes of the feed axes M1 and M2 by the minimum correction ratio Rmin. Each of the addition parts 26 generates a resultant command SC by adding the corrected oscillation command to the position deviation ΔP. Thereafter, the position speed control parts 29 of the feed axes M1 and M2 generate speed commands and torque commands based on the resultant commands Sc, and transmit the speed commands and torque commands to the feed axes M1 and M2. The feed axes M1 and M2 are controlled based on these commands.

The oscillation amplitude to which the minimum correction ratio Rmin has been applied may be even smaller than the oscillation amplitude which prevents the tool 11 from moving in the direction opposite from the machining start position Pa. Therefore, it is possible to reliably prevent the tool 11 from moving in the direction opposite from the machining start position Pa, and as a result, the formation of cuts in the flange W2 of the workpiece W can be reliably prevented.

Aspects of the Present Disclosure

According to the first aspect, a control device (20) of a machine tool (10) for cutting an outer peripheral surface or an inner peripheral surface of a workpiece (W) with a tool (11), the control device comprising a spindle (M0) for performing a relative rotation between the workpiece and the tool about an axis of rotation of the workpiece, at least one feed axis (M1, M2) for performing a relative feeding between the tool and the workpiece along a generatrix of the outer peripheral surface or the inner peripheral surface of the workpiece, a position detection part (T1, T2) for detecting a position of the feed axis, an oscillation command generation part (23) that generates an oscillation command for the at least one feed axis based on a rotation speed of the spindle and a position command for the at least one feed axis so that the oscillation command becomes a positive non-integral multiple of the rotation speed and so that the tool intermittently cuts the workpiece, an oscillation command correction part (24) for correcting the oscillation command generated by the oscillation command generation part using the position of the at least one feed axis detected by the position detection part, and an addition part (26) for adding the oscillation command which has been corrected by the oscillation command correction part to a position deviation, which is a difference between the position command and the detected position of the at least one feed axis detected by the position detection part is provided.

According to the second aspect, in the first aspect, the control device further comprises a calculation part for calculating a distance from a machining start position of the workpiece or a machining change position to a current position of the tool based on the position of the at least one feed axis, wherein the oscillation command correction part corrects the oscillation command so that an oscillation amplitude of the oscillation command is smaller than the distance calculated by the calculation part.

According to the third aspect, in the first aspect or the second aspect, the oscillation command correction part includes a correction ratio calculation part (28) for calculating a correction ratio between the oscillation amplitude prior to correction by the oscillation command correction part and the oscillation amplitude after correction, and when the control device includes a plurality of feed axes, the correction ratio of one feed axis calculated by the correction ratio calculation part is applied to the remaining feed axes.

According to the fourth aspect, in the first aspect or the second aspect, the oscillation command correction part includes a correction ratio calculation part (28) for calculating a correction ratio between the oscillation amplitude prior to correction by the oscillation command correction part and the oscillation amplitude after correction, and when the control device includes a plurality of feed axes, a minimum correction ratio from among the correction ratios of the plurality of feed axes calculated by the correction ratio calculation part is applied to the plurality of feed axes.

According to the fifth aspect, in any of the first aspect through the fourth aspect, the oscillation command generation part generates the oscillation command in which the oscillation amplitude has been subtracted as an offset value with respect to a reference axis of a cosine wave.

According to the sixth aspect, in any of the first aspect through the fifth aspect, the oscillation command generation part generates an oscillation frequency of the oscillation command such that the workpiece or the tool is shifted by a half-cycle each time the workpiece or the tool makes one revolution based on the rotation speed, and generates the oscillation amplitude of the oscillation command based on the feed speed.

According to the seventh aspect, in any of the first aspect through the sixth aspect, the oscillation command generation part generates the oscillation frequency and the oscillation amplitude so that the torque of the at least one feed axis does not exceed a predetermined value.

According to the eighth aspect, in any of the first aspect through the seventh aspect, the oscillation command generation part generates the oscillation frequency and the oscillation amplitude based on a desired length of swarf generated by the tool machining the workpiece.

According to the ninth aspect, in any of the first aspect through the eighth aspect, the workpiece is at least partially rotationally symmetrical and comprises a corner portion which is not continuous with the radially outermost portion of the workpiece on the side which is more radially inwards than the radially outermost portion in a cross-section along the axis of rotation.

Effects of the Aspect

In the first aspect, since the oscillation command is corrected based on the actual position of the feed axis, it is possible to prevent the tool from moving in the direction opposite the tool feed direction beyond the machining start position. Thus, it is possible to prevent cuts from being formed in the workpiece.

In the second aspect, since the oscillation amplitude of the oscillation command is corrected to be smaller than the distance, it is possible to prevent the tool from moving in the direction opposite from the machining start position at the start of oscillation cutting.

In the third aspect, since the correction ratio in one feed axis is applied to the remaining feed axes, it is possible to prevent the tool from moving in the opposite direction along the axis for the remaining axes. Furthermore, the load on the remaining feed axes can be reduced.

In the fourth aspect, since the minimum correction ratio is applied, it is surely possible to prevent the tool from moving in the direction opposite from the machining start point.

In the ninth aspect, it is possible to prevent cuts from being formed in the workpiece.

Although the present invention has been described with reference to representative embodiments, a person skilled in the art would recognize that the above-described modifications and various other modifications, omissions, and additions can be made without departing from the scope of the present invention.

The invention claimed is:

1. A control device of a machine tool for cutting an outer peripheral surface or an inner peripheral surface of a workpiece with a tool, the control device comprising:
   a spindle for performing a relative rotation between the workpiece and the tool about an axis of rotation of the workpiece,
   at least one feed axis for performing a relative feeding between the tool and the workpiece along a generatrix of the outer peripheral surface or the inner peripheral surface of the workpiece,
   a position detection part for detecting a position of the at least one feed axis,
   an oscillation command generation part that generates an oscillation command for the at least one feed axis based on a rotation speed of the spindle and a position command for the at least one feed axis so that the oscillation command becomes a positive non-integral multiple of the rotation speed and so that the tool intermittently cuts the workpiece,
   an oscillation command correction part for correcting the oscillation command generated by the oscillation command generation part using the position of the at least one feed axis detected by the position detection part, and
   an addition part for adding the oscillation command which has been corrected by the oscillation command correction part to a position deviation, which is a difference between the position command and the detected position of the at least one feed axis detected by the position detection part.

2. The control device according to claim 1, further comprising a calculation part for calculating a distance from a machining start position of the workpiece or a machining change position to a current position of the tool based on the position of the at least one feed axis,
   wherein the oscillation command correction part corrects the oscillation command so that an oscillation amplitude of the oscillation command is smaller than the distance calculated by the calculation part.

3. The control device according to claim 1, wherein
   the oscillation command correction part includes a correction ratio calculation part for calculating a correction ratio between the oscillation amplitude prior to correction by the oscillation command correction part and the oscillation amplitude after correction, and
   when the control device includes a plurality of feed axes, the correction ratio of one of the plurality of feed axes calculated by the correction ratio calculation part is applied to the remaining feed axes.

4. The control device according to claim 1, wherein
   the oscillation command correction part includes a correction ratio calculation part for calculating a correction ratio between the oscillation amplitude prior to correction by the oscillation command correction part and the oscillation amplitude after correction, and
   when the control device includes a plurality of feed axes, a minimum correction ratio from among the correction ratios of the plurality of feed axes calculated by the correction ratio calculation part is applied to the plurality of feed axes.

5. The control device according to claim 1, wherein the oscillation command generation part generates the oscillation command in which the oscillation amplitude has been subtracted as an offset value with respect to a reference axis of a cosine wave.

6. The control device according to claim 1, wherein the oscillation command generation part generates an oscillation frequency of the oscillation command such that the workpiece or the tool is shifted by a half-cycle each time the workpiece or the tool makes one revolution based on the rotation speed, and generates the oscillation amplitude of the oscillation command based on a feed speed.

7. The control device according to claim 1, wherein the oscillation command generation part generates the oscillation frequency and the oscillation amplitude so that torque of the at least one feed axis does not exceed a predetermined value.

8. The control device according to claim 1, wherein the oscillation command generation part generates the oscillation frequency and the oscillation amplitude based on a desired length of swarf generated by the tool machining the workpiece.

9. The control device according to claim 1, wherein the workpiece is at least partially rotationally symmetrical and comprises a corner portion which is not continuous with a radially outermost portion of the workpiece on a side which is more radially inwards than the radially outermost portion in a cross-section along the axis of rotation.

* * * * *